United States Patent [19]
Kubota et al.

[11] Patent Number: 4,592,038
[45] Date of Patent: May 27, 1986

[54] OPTICAL REPRODUCING APPARATUS

[75] Inventors: Shigeo Kubota; Kenji Shintani, both of Tokyo, Japan

[73] Assignee: Sony Corporation, Tokyo, Japan

[21] Appl. No.: 535,850

[22] Filed: Sep. 26, 1983

[30] Foreign Application Priority Data

Sep. 28, 1982 [JP] Japan ............................. 57-169367

[51] Int. Cl.$^4$ .................... G11B 7/00; G11B 21/10
[52] U.S. Cl. ................................. 369/44; 369/46; 369/121; 369/118; 369/112
[58] Field of Search .................. 358/342; 369/43, 44, 369/45, 46, 111, 121, 112, 118; 260/201 R, 201 DF

[56] References Cited
U.S. PATENT DOCUMENTS 4,462,095  7/1984  Di Chen ............................ 369/44

Primary Examiner—Robert L. Richardson
Attorney, Agent, or Firm—Lewis H. Eslinger; Alvin Sinderbrand

[57] ABSTRACT

In an optical reproducing apparatus a divergent beam from a semiconductor laser light source is collimated to form a parallel light beam that is converged by an objective lens and focussed on an optical record medium. The light beam is reflected by the optical record medium and introduced into a signal photodetector so as to provide a reproduced signal. A phase type diffraction grating between the semiconductor laser light source and a beam splitter separates the laser beam from the semiconductor laser light source into zero, plus first and minus first order diffracted beams. A pair of tracking photodetectors receive reflected beams of the plus first and minus first order diffracted beams reflected by the optical record medium and then by the beam splitter. A concave lens located between the photodetectors and the beam splitter facilitates convenient positioning of the photodetectors so that a tracking error signal can be obtained by calculating the difference between the outputs of the first and second tracking photodetectors.

4 Claims, 8 Drawing Figures

4,592,038

OPTICAL REPRODUCING APPARATUS

BACKGROUND OF THE INVENTION

1. Field of the Invention

The present invention relates generally to optical reproducing apparatus using a semiconductor laser as a light source and more particularly is directed to a compact optical reproducing apparatus employing a signal beam and two supplemental beams for detection of tracking errors.

2. Description of the Prior Art

Optical reproducing apparatus employing a signal beam and two supplemental beams for detection of tracking errors is disclosed in U.S. Pat. No. 3,876,842. In this prior art technique, however, there are problems to be solved.

OBJECTS AND SUMMARY OF THE INVENTION

Accordingly, it is an object of the present invention to provide an improved optical reproducing apparatus.

It is another object of the present invention to provide an optical reproducing apparatus which has a compact optical system.

It is a further object of the present invention to provide an optical reproducing apparatus employing a signal beam and two supplemental beams for detection of tracking errors.

According to one aspect of the present invention, there is provided an optical reproducing apparatus comprising:

(a) a semiconductor laser light source emitting a divergent laser light beam;

(b) a collimator lens making said divergent laser light beam to be a parallel laser light beam;

(c) an objective lens focussing said parallel laser light beam on a reflective optical record medium;

(d) a first photodetector receiving said light beam reflected by said optical record medium and producing a reproduced signal;

(e) a beam splitter provided between said semiconductor laser light source and said collimator lens and splitting said laser light beam;

(f) a diffraction grating of a phase type provided between said semiconductor laser light source and said collimator lens and separating said laser light beam from said semiconductor laser light source into zero, plus first and minus first order diffracted beams;

(g) second and third photodetectors receiving plus first and minus first order diffracted beams reflected by said optical record medium and then by said beam splitter, said first photodetector receiving zero order diffracted beam reflected by said optical record medium and then by said beam splitter; and (h) a concave lens provided between said photodetectors and said beam splitter and facilitating positioning of the photodetectors so that a tracking error signal can be obtained by calculating the difference between the detected outputs of said second and third photodetectors.

The other objects, features and advantages of the present invention will become apparent from the following description taken in conjunction with the accompanying drawings in which the like references designate the same elements and parts.

DESCRIPTION OF THE PREFERRED EMBODIMENT

An embodiment of an optical reproducing apparatus according to the present invention will hereinafter be described in detail with reference to FIG. 1.

Figure 1:
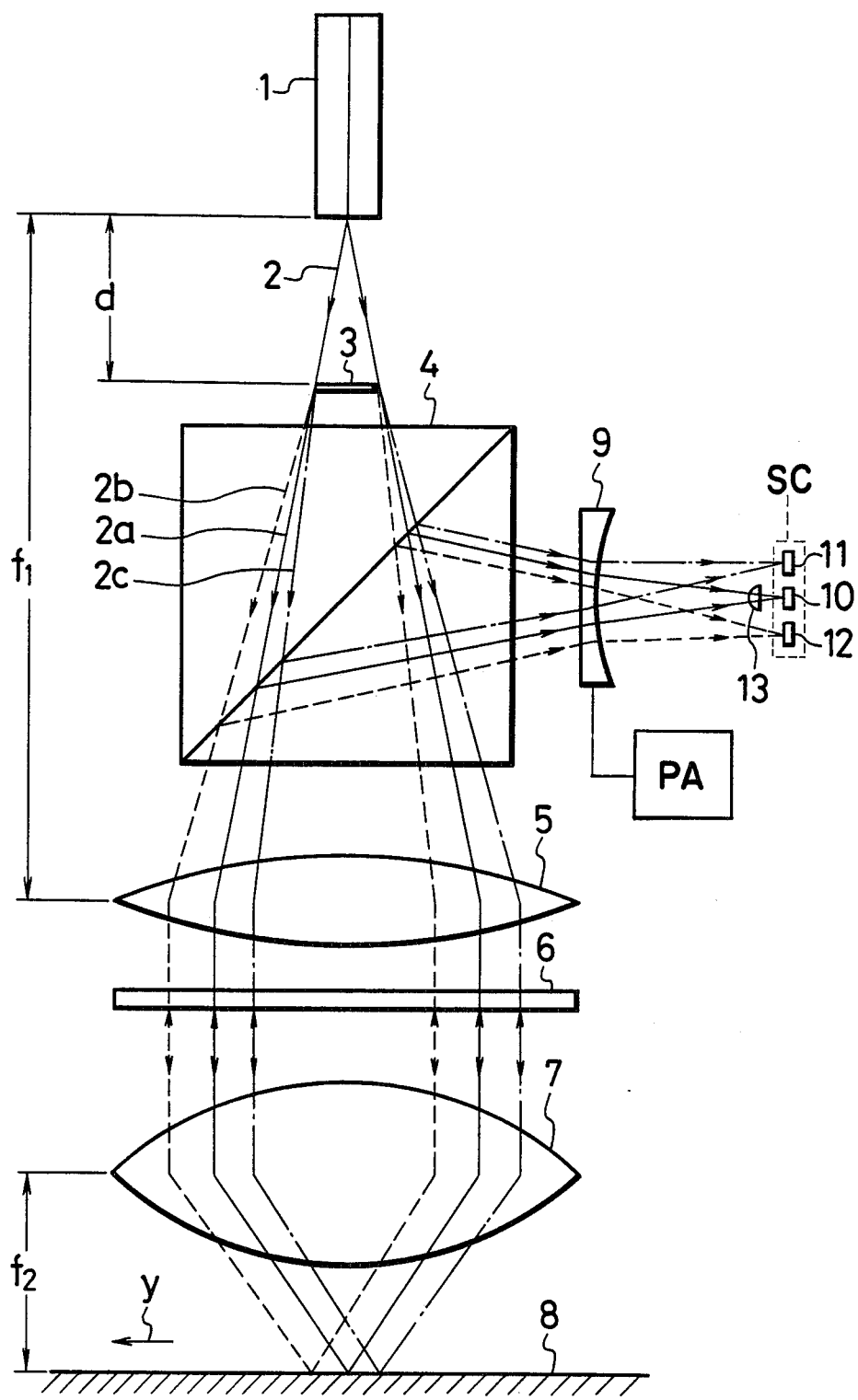
FIG. 1 is a diagram schematically showing an embodiment of an optical reproducing apparatus according to the present invention.

In FIG. 1, reference numeral 1 designates a semiconductor laser light source (laser diode), and a laser beam 2 emitted therefrom is a divergent beam (spherical wave beam). Reference numeral 4 designates a polarizing beam splitter, 5 a collimator lens, 6 a ¼ wavelength plate, 7 an objective lens, 8 a reflective optical record medium, 10 a first photodetector for providing a reproduced signal and 13 a semi-cylindrical lens (cylindrical lens) serving as an astigmatism lens.

Then, a phase type diffraction grating 3 is provided in the optical path between the semiconductor laser light source 1 and the collimator lens 5, in the optical path between the semiconductor laser light source 1 and the beam splitter 4 in this embodiment. As a result, the laser beam 2 emitted from the semiconductor laser light source 1 is separated by this diffraction grating 3 into zero order diffracted beam 2a (shown by a solid line), plus first order diffracted beam 2b (shown by a broken line) and minus first order diffracted beam 2c (shown by dash-dot line), respectively. The beams 2a to 2c thus separated are incident through the beam splitter 4 on the collimator lens 5 by which they are collimated, and introduced through the ¼ wavelength plate 6 into the objective lens 7 which focuses them in line on the record medium (rotation disc) 8. The beams 2a, 2b and 2c being focussed or converged on the record medium 8 form spots 2a', 2b', 2c' (FIG. 2) which are arranged along the y direction in which each record tracks extend on the record medium 8. Successive tracks are displaced from one another in the x direction, which extends at right angles to the y direction. Thus, before and after the zero order diffracted beam 2a are positioned the plus first order diffracted beam 2b and the minus first order diffracted beam 2c. The beams 2a to 2c reflected by the record medium 8 are returned, reflected by the beam splitter 4, and then introduced through a concave lens 9 to the photodetectors 10, 11 and 12. The tracking photodetectors 11 and 12 are provided separately from the photodetector 10 which obtains the reproduced signal. The tracking photodetectors 11 and 12 receive the plus first order diffracted beam 2b and the minus first order diffracted beam 2c, respectively. In this case, the zero order diffracted beam 2a is introduced through the semi-cylindrical lens 13 into the signal photodetector 10.

By the provision of the concave lens 9, the spacing of the focussing positions of the respective beams 2a to 2c, and therefore the spacing of the photodetectors 10, 11 and 12, can be adjusted, for example widened. When the concave lens 9 is placed relative to the beam splitter 4 in such a manner that the beams 2a to 2c may be introduced into the concave lens 9 along the direction to its back focus, the respective beams 2a to 2c passed through the concave lens 9 become parallel with one another as they emerge from the lens 9 (see FIG. 8). Thus, it is possible to freely select the distance between each of the photodetectors 10 to 12 and the concave lens 9. The concave lens 9 will be described in detail later.

Figure 2:
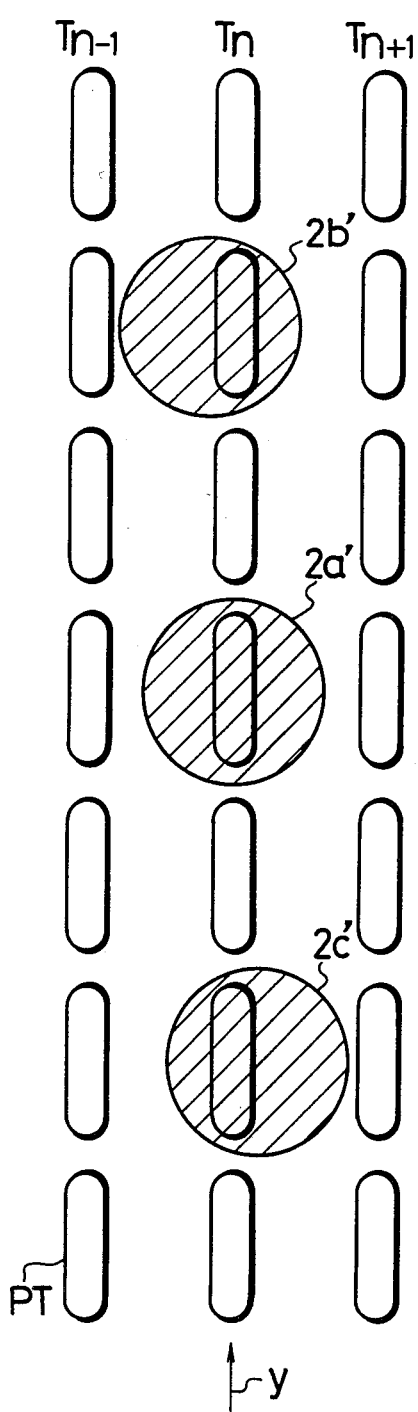
FIG. 2 is a diagram showing pit patterns which are formed on a record medium and reproduced by the optical reproducing apparatus of the invention shown in FIG. 1.

FIG. 2 is a diagram showing arbitrary adjacent record tracks $T_{n-1}$, $T_n$ and $T_{n+1}$ (n is an integer) formed on the record medium 8, each of which is formed of the series of pits PT. The tracks form, for example, a spiral nearly a circle, or concentric circles. Reference numerals 2a', 2b' and 2c' respectively designate beam spots of the beams 2a, 2b and 2c on the record medium 8.

Figure 3:
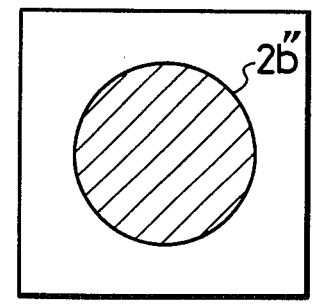
FIGS. 3, 4 and 5 are respectively plan diagrams showing photodetectors used in the present invention.
Figure 4:
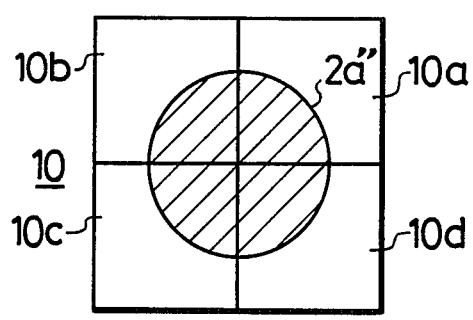
Figure 5:
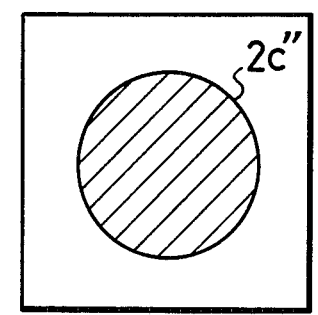

FIGS. 3 to 5 are respectively diagrams showing detection surfaces of the photodetectors 11, 10 and 12 in which reference numerals 2b'', 2a'' and 2c'' respectively designate beam spots of the beams 2b, 2a and 2c formed thereon. In this case, the detection surface of the photodetector 10 is divided into photodetection sections 10a to 10d respectively lying in four quadrants as shown in FIG. 4.

The reproduced signal (video signal, audio PCM signal or the like) can be obtained by adding the detection outputs from the respective detection sections 10a to 10d of the photodetector 10.

Because of the astigmatism of the semi-cylindrical lens 13, a focussing error signal can be obtained by calculating the difference between the sum of the detected outputs of the detection sections 10a and 10c of the first and third quadrants of the photodetector 10 and the sum of the detected outputs of the detection sections 10b and 10d of the second and fourth quadrants thereof. The beam spot 2a'' becomes a circle only in the focus state, while it becomes an ellipse in the defocus state. The objective lens 7 (shown in FIG. 1) is moved along the optical axis direction thereof by the focussing error signal.

On the other hand, a tracking error signal can be obtained by subtracting the detected outputs of the tracking photodetectors 11 and 12. In accordance with this tracking error signal, the objective lens 7 is moved along the direction parallel to the plane of the second medium 8 and perpendicular to the record tracks on the record medium 8. Alternatively it is possible that a tracking mirror may be provided and then rotated in accordance with the tracking error signal.

Figure 6:
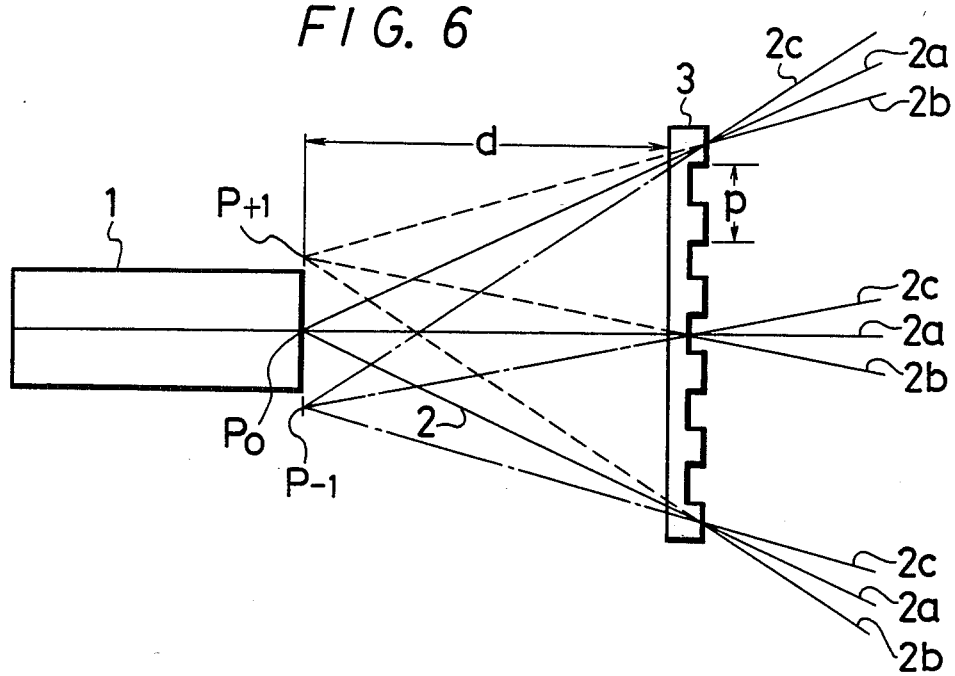
FIGS. 6, 7 and 8 are respectively diagrams used to explain the optical reproducing apparatus according to the present invention shown in FIG. 1.

The positional relation between the semiconductor laser light source 1 and the phase type diffraction grating 3 will be described with reference to FIG. 6. The beam emission point of the laser light source 1 becomes a real point light source $P_0$ of the zero order diffracted beam 2a. On the other hand, imaginary point light sources $P_{+1}$ and $P_{-1}$ of the plus and minus first order diffracted beams 2b and 2c are placed at both sides of the real point light source $P_0$, each being spaced apart therefrom by $\lambda d/p$, in which d represents the distance between the beam emission point of the laser light source 1 and the diffraction grating 3, $\lambda$ the wavelength of the emitted laser beam 2, and p the arranging pitch of the diffraction grating 3. The apparent wave fields on the imaginary point light sources $P_{+1}$ and $P_{-1}$ are a convergent wave having the same waveform as that of the zero order diffraction wave front and coincide with Fraunhofer's diffraction image produced on the light source surface when the diffraction grating 3 is irradiated except for the direction of movement of the wave front. Thus, the wave fields on the imaginary point light sources $P_{+1}$ and $P_{-1}$ become equivalent to that on the real point light source $P_0$.

Figure 7:
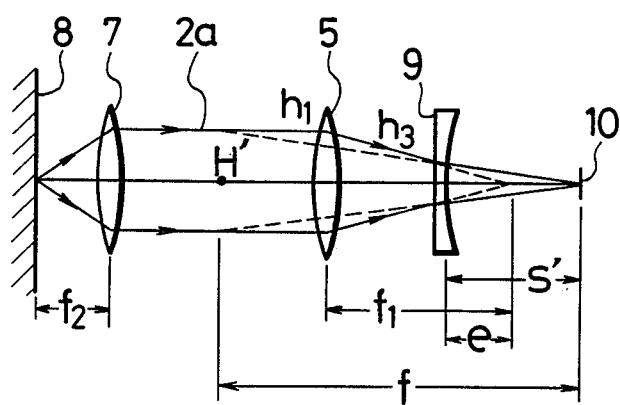

Subsequently, the concave lens 9 located between the beam splitter 4 and the photodetectors 10 to 12 will be described with reference to FIGS. 1 and 7. FIG. 7 is a diagram equivalent to FIG. 1 with respect to the positional relation among the lenses 5, 7, 9, the record medium 8 and the photodetector 10 in FIG. 1. In FIG. 7, the beams 2b and 2c are omitted and only the beam 2a is indicated. The focal distances or lengths of the collimator lens 5, the objective lens 7 and the concave lens 9 are taken as $f_1$, $f_2$ and $f_3$, respectively. Under the above assumption, a focal length f of the synthesized lens formed of the collimator lens 5 and the concave lens 9 is expressed as:

$$f = \frac{1}{f_1} + \frac{h_3}{h_1} \cdot \frac{1}{f_3} \tag{1}$$

in which $h_1$ and $h_3$ respectively represent the image heights on the lenses 5 and 9. The magnification when the beams 2a to 2c from the diffraction grating 3 are each passed through the lenses 5 and 7 and then focussed on the record medium 8 becomes $f_1/f_2$. Meanwhile, the magnification when the beams 2a to 2c reflected by the record medium 8 are each passed through lenses 7, 5 and 9 and then focussed on the photodetectors 10 to 12 becomes $f/f_2$. Consequently, each spacing among the beam spots 2a'', 2b'' and 2c'' on the photodetectors 10 to 12 is expressed as $(f/f_1) \cdot (\lambda d/p)$. On the other hand, since $f_3 < 0$ is satisfied in equation (1), $f > f_1$, namely, $f/f_1 > 1$ is satisfied. Thus, it is understood that the spacing expressed by $(f/f_1) \cdot (\lambda d/p)$ among the beam spots 2a'', 2b'' and 2c'' is made larger than the spacing expressed by $\lambda d/p$ among the point light sources $P_0$, $P_{+1}$ and $P_{-1}$ on the laser light source 1.

The magnification of the lenses 5 and 7 is determined by $f_1/f_2$ as described above. Then, if NAs (numerical apertures) of the respective lenses 5 and 7 are represented as $NA_1$ and $NA_2$, the magnification $m_1$ is expressed by $NA_2/NA_1$, which magnification value, however, can not be selected freely. Meanwhile, the spacing among the beam spots 2a', 2b' and 2c' on the record medium 8 is expressed as $(f_1/f_2) \cdot (\lambda d/p)$. However, since this spacing $(f_1/f_2) \cdot (\lambda d/p)$ is an optimum value in a certain range, the spacing $\lambda d/p$ among the point light sources $P_0, P_{+1}$ and $P_{-1}$ also can not be selected freely. Thus, the variable power effect of the concave lens 9 is important. Namely, the concave lens 9 allows the spacing among the beam spots 2a'', 2b'' and 2c'' and the spacing among the photodetectors 10 to 12 to be selected freely so that the designing of the optical system becomes easy.

If the magnification $f/f_1$ is made large, the focal length f also becomes large. In this case, however, the second principal point H' (see FIG. 7) of the synthesized lens is largely returned to the forward direction so that the back focal distance or length S' of the concave lens 9 is not so much increased, thus making the optical system compact. The number of the concave lens 9 may be selected more than two.

The coefficient $h_3/h_1$ in the equation (1) can be expressed as:

$$(h_3/h_1) = (e/f_1) \quad (2)$$

in which e represents the distance between the concave lens 9 and the point at which the beam 2a would converge in the absence of the concave lens 9. Thus, the magnification, $f/f_1$ is expressed as:

$$\frac{f}{f_1} = \frac{1}{1 + \frac{e}{f_3}} = \frac{S'}{e} \quad (3)$$

Accordingly, even if the focal length $f_1$ is scattered, the magnification $f/f_1$ can be modified by changing the distance e, namely, the locating position of the concave lens 9 by a position adjuster PA. Also, the back focal length S' can be corrected to be the optimum value by adjusting the distance e.

Moreover, as set forth above, the magnification $f/f_1$ is selected larger than 1 or to satisfy the condition $(f/f_1) > 1$. Then, if the distance e is corrected by $\Delta e$, the changed amount $\Delta S'$ of the back focal length S' is expressed as $\Delta S' = (f/f_1)^2 \Delta e$. Thus, the position adjustment of the semi-cylindrical lens 13 (which requires high accuracy) can be replaced with the position adjustment of the concave lens 9.

Figure 8:
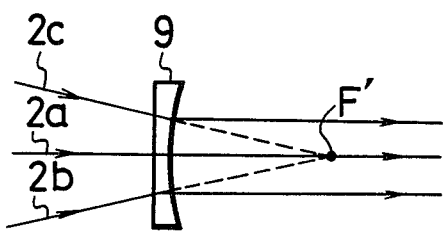

The optical density of the beam 2 emitted from the semiconductor laser light source 1 has a Gaussian distribution which is maximum on the optical axis and decreases towards the peripheral edge thereof. And, the zero and plus and minus first order diffracted beams 2a to 2c from the diffraction grating 3 each have similar distribution. If the portions of the beams 2a to 2c having the maximum optical densities are taken as principal rays, respectively, the respective principal rays of the beams 2a to 2c intersect one another on the diffraction grating 3 so that the diffraction grating 3 can be regarded as the entrance pupil. When the image of the entrance pupil formed by the optical system (the collimator lens 5⇌the objective lens 7⇌the record medium 8) is made coincident with the back focus F' of the concave lens 9 as shown in FIG. 8 (while keeping the d/p and therefore λd/p constant even though the distance d varies), the principal rays of the respective beams 2a to 2c passed through the concave lens 9 become parallel with one another. Thus, regardless of the positions of the photodetectors 10 to 12 relative to the concave lens 9, the spacing of the beam spots 2a'' to 2c'' is uniform.

According to the above embodiment of the present invention, in the optical reproducing apparatus which employs a semiconductor laser as a laser light source, since the phase type diffraction grating is provided in the optical path between the semiconductor laser light source and the collimator lens and the zero and plus and minus first order diffracted beams reflected on the optical record medium are respectively irradiated on the first, second and third photodetectors, the optical reproducing apparaus is compact and is capable of tracking error detection by means of two beams in addition to the main signal beam.

In this connection, instead of the diffraction grating, three laser light sources may be provided. However, it is quite difficult to make them uniform with respect to their wavelengths, temperature characteristics, similarity of intensity distribution of quantity of light and so on.

Also, the phase diffraction grating may be provided between the collimator lens and the beam splitter, which arrangement, however, causes the length of the optical system to be increased.

According to the present invention, since the concave lens is provided between the beam splitter and three photodetectors, the distance or spacing among the three photodetectors can easily be enlarged, and the distance or spacing among the zero, plus first and minus first order diffracted beams in the plane of the three photodetectors can be adjusted by adjusting the position of the concave lens 9 along the optical access. Hence the three photodetectors can be formed on a single semiconductor substrate SC (FIG. 1) with a great deal of ease even employing existing semiconductor manufacturing techniques.

Furthermore, according to the present invention, the position adjustment of the astigmatism system focussing error detecting semi-cylindrical lens (cylindrical lens) can be replaced with the position adjustment of the concave lens.

The above description is of a single preferred embodiment of the invention, but it will be apparent that many modifications and variations could be effected by one skilled in the art without departing from the spirit or scope of the novel concepts of the invention, so that the scope of the invention should be determined by the appended claim only.

We claim as our invention:

1. An optical reproducing apparatus comprising:
   a semiconductor laser light source emitting a divergent laser light beam;
   an objective lens mounted in spaced-apart relation to said semiconductor laser light source;
   first, second and third photodetectors respectively mounted in spaced-apart relation to said semiconductor laser light source and objective lens;
   a beam splitter mounted between said semiconductor laser light source and said objective lens;
   a diffraction grating of a phase type mounted between said semiconductor laser light source and said, beam splitter, said diffraction grating separating said laser light beam from said semiconductor laser light source into zero, plus first and minus first order diffracted beams;
   said objective lens focussing said diffracted beams onto a reflective optical record medium, and said beam splitter directing said zero, plus first and minus first order diffracted beams as reflected by said reflective optical record medium onto said first, second and third photodetectors, respectively; and
   a concave lens for diverging said diffracted beams, said concave lens being mounted between said photodetectors and said beam splitter and facilitating positioning of said photodetectors so that a tracking error signal can be obtained by calculating the difference between the detected outputs of said second and third photodetectors.

2. An optical reproducing apparatus as claimed in claim 1; wherein said diffraction grating is mounted between said semiconductor laser light source and said beam splitter.

3. An optical reproducing apparatus as claimed in claim 1; further comprising a single semiconductor substrate, said first, second and third photodetectors being formed on said single semiconductor substrate.

4. An optical reproducing apparatus as claimed in claim 3; further comprising a position adjustor for adjusting the position of said concave lens.

* * * * *